United States Patent [19]
Kalabakas

[11] Patent Number: 5,381,930
[45] Date of Patent: Jan. 17, 1995

[54] DISPENSING DEVICE FOR A MEASURED VOLUME OF LIQUID

[76] Inventor: Peter Kalabakas, AP House, 43 Derby Road, Bertrams, South Africa

[21] Appl. No.: 163,994

[22] Filed: Dec. 7, 1993

Related U.S. Application Data

[63] Continuation-in-part of Ser. No. 4,577, Jan. 14, 1993, abandoned.

[30] Foreign Application Priority Data

Jan. 15, 1992 [ZA] South Africa .................. ZA92/0281
May 26, 1992 [ZA] South Africa .................. ZA92/3843

[51] Int. Cl.⁶ ............................................. B65D 47/20
[52] U.S. Cl. ..................................... 222/205; 222/464
[58] Field of Search .............. 222/205, 109, 464, 578, 222/579, 158

[56] References Cited

U.S. PATENT DOCUMENTS

| | | | |
|---|---|---|---|
| 1,867,801 | 7/1932 | Bienenstein et al. | 222/579 |
| 1,932,765 | 10/1933 | Bienenstein | 222/578 |
| 1,941,933 | 1/1934 | Douglas | 222/578 |
| 2,237,791 | 4/1941 | Pastor | 222/579 |
| 3,767,088 | 10/1973 | Deussen | 222/205 |
| 4,548,524 | 10/1985 | Seager | 222/205 X |
| 4,830,226 | 5/1989 | Kong | 222/205 |
| 4,936,490 | 6/1990 | Batlegazzore | 222/205 |
| 4,971,226 | 11/1990 | Donoghue | 222/205 X |
| 5,031,802 | 7/1991 | Joulia | 222/205 |

FOREIGN PATENT DOCUMENTS

| | | |
|---|---|---|
| 13918 | 3/1983 | European Pat. Off. . |
| 239285 | 9/1987 | European Pat. Off. . |
| 331589 | 9/1989 | European Pat. Off. . |
| 475546 | 3/1992 | European Pat. Off. . |
| 484528 | 5/1992 | European Pat. Off. . |
| 3151522 | 7/1983 | Germany .................. 222/205 |
| 100833 | 1/1991 | WIPO . |

*Primary Examiner*—Andres Kashnikow
*Assistant Examiner*—Anthoula Pomrening
*Attorney, Agent, or Firm*—Ladas & Parry

[57] ABSTRACT

A dispensing device for dispensing a measured volume of liquid from a body of liquid contained in a container, which includes a receptacle for receiving an unmeasured excess volume of liquid from the body of liquid and a conduit to connect the container to the receptacle. The conduit permits liquid to flow from the body of liquid into the receptacle when a reduced pressure is created in the receptacle. The device further includes a lid to fit over the receptacle so as to be displaceable relative to the receptacle from a closed position to a dispensing position, the arrangement being such that relative displacement between the lid and receptacle can create a pressure differential between the container and the receptacle to cause liquid to flow from the body of liquid in the container to the receptacle. A part of the conduit serves to adjust the unmeasured excess volume of liquid in the receptacle to the measured volume.

7 Claims, 4 Drawing Sheets

DISPENSING DEVICE FOR A MEASURED VOLUME OF LIQUID

This is a continuation-in-part of copending application(s) Ser. No. 08/004,577 filed on Jan. 14, 1993, now abandoned.

THIS INVENTION relates to a dispensing device for dispensing a measured volume of a liquid from a body of liquid contained in a container.

BACKGROUND OF THE INVENTION

More particularly the invention relates to a dispensing device to be provided on a container in the form of a bottle for dispensing a measured dose or tot of the liquid contents of the bottle, which may be a liquid pharmaceutical or medicinal formulation, an alcoholic beverage, e.g. a distilled alcoholic liquor, a liquid concentrate, or the like. The dispensing device of the invention is particularly suitable to be used for dispensing liquids which are viscous or sticky or prone to crystal formation or clogging, such as medicines in the form of syrups, i.e. having a high sugar content, which tend to form sugar crystals or sticky deposits impeding the operation of a conventional closure cap or existing dispensing devices.

SUMMARY OF THE INVENTION

According to the invention there is provided a dispensing device for dispensing a measured volume of liquid from a body of liquid contained in a container in bottle form having a bottom and a neck provided with a rim defining an outlet, the dispensing device including a receptacle for receiving an unmeasured excess volume of liquid from the body of liquid, the receptacle having a stopper part for insertion into the neck of the container in sealing relationship, and a cup part extending outside the neck beyond the rim of the neck;

a conduit extending between the receptacle and the container to permit liquid to flow from the body of liquid into the receptacle;

a cap-type lid removably associated with the receptacle and the neck to fit over and around the cup part of the receptacle and the neck and engageable with the outside of the neck; and volume adjustment means to adjust a said unmeasured excess volume of liquid in the receptacle to a measured volume; and in which the cup part of the receptacle has an upstanding side wall presenting an outer face and an open upper end and is provided on the outer face with an outwardly extending circumferential sealing lip; and the cap-type lid has a transverse top wall and a depending side wall presenting an inner face which is located in sealing relationship with the sealing lip of the cup part when the lid is associated with the receptacle; and the lid is displaceable relative to the receptacle between a closed position in which the lid is engaged with the outside of the neck, a dispensing position in which the lid is located over the cup part of the receptacle but spaced from the neck, and an open position in which the lid is removed from the receptacle to expose the open upper end of the cup part, the sealing lip of the cup part and the said inner face of the lid being located in sliding sealing relationship during the said displacement; and in which the receptacle and the lid define between them a closed chamber when the lid is fitted over the receptacle, and displacement of the lid from the closed position to the dispensing position causes a pressure reduction within the chamber to cause a said unmeasured excess volume of liquid to flow from the body of liquid through the conduit into the receptacle, the said excess volume being adjusted to a said measured volume of liquid by the volume adjustment means.

The container may be in the form of a bottle having a wider base portion with a bottom and a narrower neck portion with a neck defining an outlet, the receptacle being configured so that the stopper part of it forms a closure member for closing the outlet, with the conduit interconnecting the bottle and the receptacle. The receptacle may thus form part of a closure means for closing the outlet of the bottle, and the conduit may pass through a wall of the receptacle to interconnect the container and the receptacle.

The bottle may, for example, be a medicine bottle, or a bottle for an alcoholic beverage such as a distilled alcoholic liquor. The bottle may typically be made of glass or of a synthetic plastics material.

The stopper part of the receptacle may be provided with at least one gripping formation, such as an outwardly bulging side wall or one or more resilient ridges or outwardly directed resilient protuberances, for engagement with the neck of the bottle to impede or hinder withdrawal of the device from the neck of the bottle once the stopper part has been inserted into the neck of the bottle. This feature is of particular importance as a safeguard against accidental removal of the stopper e.g. by children.

The receptacle may be a hollow generally cup-shaped structure, having a generally upwardly extending side wall defining a narrower lower portion with a transverse base wall, and a wider upper portion with an open upper end, the narrower lower portion forming the stopper part, and the wider upper portion constituting the cup part. The lower stopper part of the cup-shaped receptacle may thus, in use, be positioned like a stopper within the neck of a container in the form of a bottle, while the wider upper portion constituting the cup part will extend beyond the rim of the neck, for a reason described more fully below. The receptacle may be of stepped configuration, the narrower lower portion being connected to the wider upper portion by an annular shoulder, which annular shoulder may be located on the rim of the neck when the stopper part of the receptacle has been placed within the neck of the container.

In a preferred embodiment, engagement means conveniently in the form of a peripheral flange or lip formation may be provided around the annular shoulder, the flange or lip formation being engageable around the neck of the container to provide improved sealing between the stopper and the neck.

A cap-type closure lid is removably associated with the receptacle and the bottle neck, for closing off the open upper end of the receptacle. The lid may be provided with engagement means for engagement with the outside of the neck of the container in the form of a bottle, to serve as a closure lid for the bottle. The engagement means may be an internal screw thread provided on the lid for engagement with a complementary external screw thread provided on the neck of the bottle. The closure lid may also serve to achieve in conjunction with the receptacle a suction effect to cause displacement of liquid from the body of liquid to the receptacle, as described in more detail below.

The lid and the receptacle may together constitute a pressure reduction means, the lid and the receptacle being arranged in sealing relationship relative to one another to define between them a closed chamber, the lid being capable of relative displacement in a manner to enlarge the volume of said chamber to cause a reduction of pressure in the said chamber. The closure lid may present an inner sealing face, and in use fits over the receptacle so that the circumferential sealing lip on the outer surface of the side wall of the receptacle abuts sealingly and slidingly against the inner sealing face of the lid, the lid and the receptacle together defining the closed chamber. By displacing the closure lid away from the receptacle, e.g. by unscrewing the closure lid from the container and withdrawing it in sliding fashion over the side wall of the receptacle, a reduced pressure may thus be created in the closed chamber defined between the receptacle and the closure lid, to create a suction effect.

It is an important feature of the device according to the invention, that the sealing contact between the receptacle and the closure lid takes place on the outside of the receptacle. In an existing prior art dispensing device, where a suction chamber is defined between a receptacle and a closure lid in that the lid has a depending skirt formation extending into the receptacle and co-operating in sealing fashion with the inner surface of the receptacle, the functioning is impeded in the case of medicines in the form of syrups, by sugar crystal formation and/or sticky deposits occurring against the inner surface of the receptacle, between the sealing faces of the receptacle and the skirt formation, Such deposits not only hinder effective operation of such a device, but cause inaccurate measurement of the volume of medicine to be dispensed.

In the present device, liquid being dispensed does not reach the outside sealing face of the receptacle, so that sugar crystal formation or sticky deposits do not impede the effective operation of the dispensing device of the present invention, even in the case of syrups or other viscous liquids being dispensed therewith.

The Applicant has found that a further factor which prevents or at least impedes proper sealing between the receptacle and the lid, concerns the deformation of the shape of one or both of these units. For example, since a member comprising a sealing lip generally has to be made of a material having a degree of pliability or resilience, e.g. a non-rigid synthetic plastics material, deformation of the member and/or the sealing lip takes placing during use. In order to counter-act such deformation, and to ensure continued effective sealing and thus effective suction, the circumferential sealing lip on the outside of the side wall of the receptacle in Applicant's device is preferably provided at the open upper end of the cup part, in the form of a peripheral lip formation extending around the said open upper end; and the closure lid according to the invention is provided with a transverse top wall which has an inner face with an annular groove provided in the said inner face to receive the peripheral sealing lip when the lid is in the closed position.

This feature ensures that the sealing lip is contained within the annular groove when the cap is closed and the bottle is not in use, whereby the shape of the open upper end of the cup part and of the sealing lip is maintained.

Another important feature of the dispensing device according to the present invention, is the provision of air release means to expel compressed air from the chamber defined between the receptacle and the closure lid, when the lid is being closed. According to this feature, air release means is provided to permit compressed air to escape from the closed chamber when the lid is displaced to its closed position, the air release means for example comprising a depression in the inner face of the side wall of the lid, which depression is located in the proximity of the tranverse top wall of the lid, to create an air passage when the sealing lip of the cup part is displaced over the said depression when the lid is displaced to the closed position.

The depression may be in the form of one or more notches provided in the inner face of the side wall of the closure lid, near the closed end thereof. The notches may be no more than about 0.1 mm in depth and about 0.1-1 mm in diameter. When the sealing lip on the outside face of the receptacle passes over such notch(es) just prior to the closure lid being brought to its closed position, one or more capillary air release passages will be created to permit compressed air in the closed chamber to be released.

In an alternative embodiment, the air release means may comprise one or more protuberance on the inner face of the side wall of the lid located in the proximity of the transverse top wall of the lid, to create an air passage when the sealing lip of the cup part is displaced over and is deformed by the said protuberance when the lid is displaced to the closed position.

Again a protuberance may be no more than about 0.1 mm in height and about 0.1-1 mm in diameter, so that the slight deformation caused in the sealing lip when the lip passes over the protuberance(s) during displacement of the lid to its closed position, will cause one or more capillary air release passages to be created to permit compressed air in the closed chamber to be released.

The importance of this feature should be appreciated: Unless air which is compressed in the closed chamber during closure of the lid, is allowed to escape, the suction effect created when the lid is displaced to the dispensing position will be impaired, and flow of liquid into the receptacle will be reduced, thus resulting in inaccurate volumetric measurement of the measured volume to be dispensed. Furthermore, maintaining the interior of the container in a pressurised condition during non-use may result in damage to the container or the dispensing device, or may cause leakage of the liquid contents of the container.

It should be noted that the air release means in Applicant's device is provided near the upper end of the closure lid. This feature prevents leakage of the liquid contents in the form of droplets entrained in the air flow released from the closed chamber. In existing devices, where an air escape route is provided at or near the bottom wall of a dispensing cavity, undesired leakage of liquid may occur.

If desired, the stopper part of the receptacle may be provided with air inlet means for allowing air into the container when the liquid is sucked through the conduit into the receptacle, to equalize the pressure in the container and atmospheric pressure. The air inlet means may comprise at least one groove on the outer face of the side wall of the stopper, extending in a direction to place the container in communication with the atmosphere, for allowing air into the container.

The conduit may comprise a tube passing through the transverse base wall of the receptacle, with an upper portion projecting operatively upwardly from the base wall and provided with at least one opening at or near an upper end thereof, and a lower portion terminating in a lowr open end and projecting operatively downwardly from the base wall so that, in use, the upper portion projects into the receptacle and the lower portion projects into the container.

The upper end of the conduit may preferably be sealed and the conduit may be provided with at least one opening located below the sealed end of the conduit and arranged to expel liquid in a sideways or downward direction. This will serve to prevent or limit a fountain effect when liquid is sucked up through the conduit, thereby preventing or reducing the likelihood that liquid will strike and adhere to the inside of the lid of the dispensing device and effect the volume of liquid dispensed. The dispensing device will typically be used for dispensing a measured volume of a medicinal liquid from a medicine container such as a medicine bottle. In such a case the dispensing device will be inserted into the neck of the bottle.

The flow prevention means may serve to prevent flow of liquid from the container through the conduit and into the receptacle when the liquid in the receptacle is being dispensed, e.g. when the container is tipped or inverted to dispense the measured volume of liquid from the receptacle. The flow prevention means may simultaneously prevent flow of liquid from the receptacle into the container e.g. when the container is tipped to dispense the measured volume of liquid.

The flow prevention means may be provided by the conduit itself. Thus, the flow prevention means may comprise the lower portion of the tube, the lower end being located close to the base of the container so that, when the container is tipped to dispense the measured volume of liquid from the receptacle, the level of the liquid in the tipped container will be below the lower open end of the tube so that further flow of liquid from the container through the tube will not occur.

The volume adjustment means may also be provided by the conduit itself, namely the upper portion thereof which extends to a predetermined level into the receptacle. For example, the volume adjustment means may comprise the upper portion of the tube, the opening in the upper portion being located at a predetermined level above the base wall of the receptacle, so that the measured volume of liquid will be contained in the receptacle when it is filled with liquid up to the level of the opening. Excess liquid in the receptacle will, in use, run back into the container through the conduit when the pressures in the receptacle and container are equalized, until the level of liquid in the receptacle levels with the opening in the upper end of the conduit, when liquid flow back into the container will stop. The volume of liquid remaining in the receptacle will be determined by the distance between the opening in the upper end of the conduit and the base of the receptacle. This distance can be varied in different embodiments of the invention, so that the volume of liquid remaining in the receptacle, and hence the volume of liquid dispensed from the receptacle can be varied. The distance can be made, for example, to correspond with a volume of 5 ml in the receptacle, this volume being a typical medicine measure.

The length of the upper portion of the tube may also be adjustable, so that the measured volume may be adjusted, as required in different circumstances. The upper portion of the tube and/or the receptacle may advantageously be calibrated, to facilitate its adjustment.

BRIEF DESCRIPTION OF THE DRAWINGS

The invention will now be described by way of example with reference to the accompanying diagrammatic drawings in which.

In all of the Figures, similar parts of the device and the bottle have been indicated by the same reference numeral, for ease of reference.

DESCRIPTION OF THE PREFERRED EMBODIMENTS

As shown in the Figures, reference numeral 10 generally indicates a dispensing device in accordance with the invention. The device is referred to hereinafter as a dispenser.

The dispenser 10 comprises a cap-type closure element or lid generally indicated by reference numeral 12 and a receptacle generally indicated by reference numeral 14.

Figure 1:
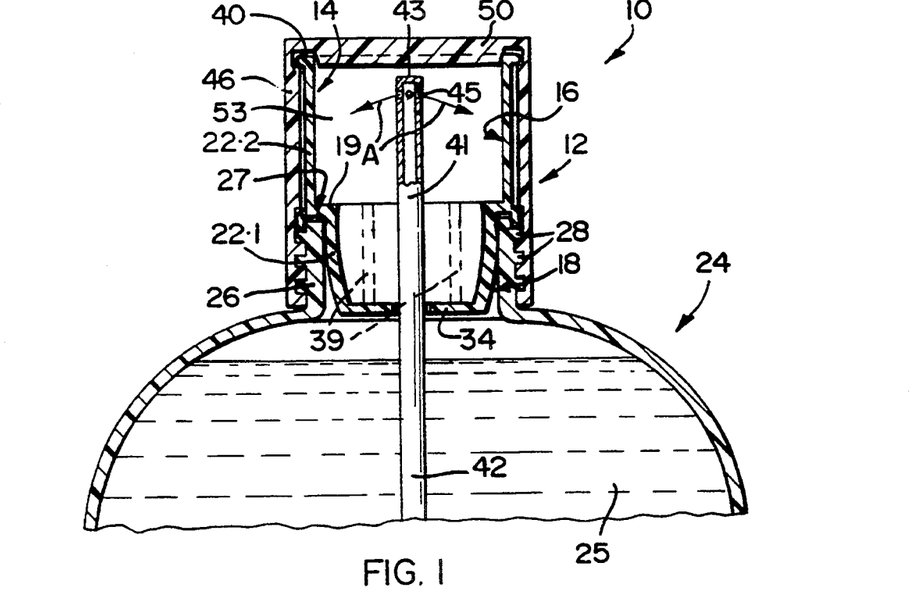
FIG. 1 is a sectional side view of one embodiment of a dispensing device in accordance with the invention, the dispensing device being mounted on a bottle only part of which is shown, and with the closure cap shown in a closed state.
Figure 2:
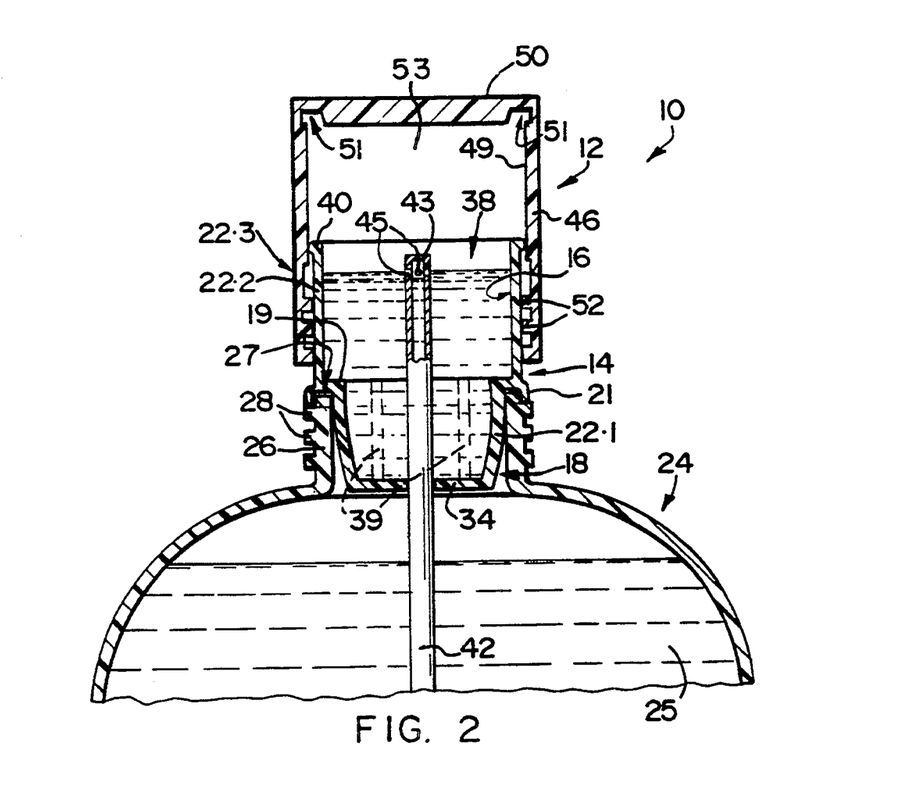
FIG. 2 is a sectional side view of the dispensing device of FIG. 1 but with the closure cap shown in the dispensing state.
Figure 3:
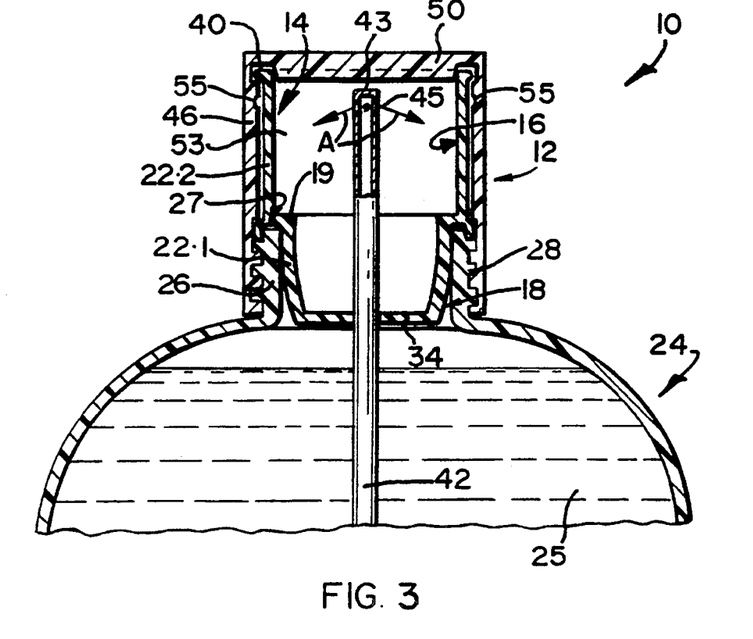
FIG. 3 is a sectional side view of an alternative embodiment of a dispensing device in accordance with the invention, the dispensing device again being shown mounted on a bottle only part of which is shown, and with the closure cap shown in the closed state.
Figure 4:
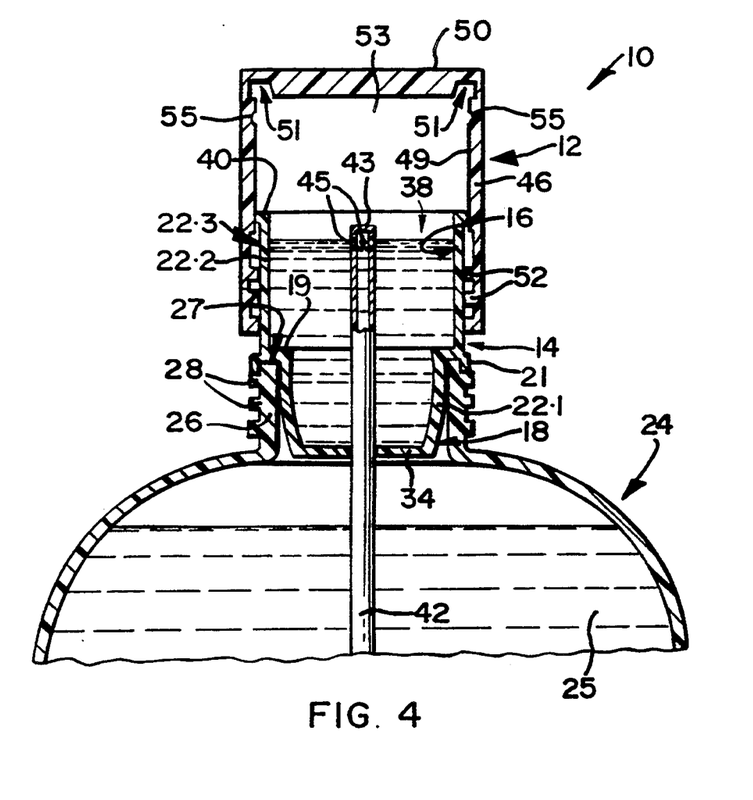
FIG. 4 is a sectional side view of the dispensing device of FIG. 3, but with the closure cap shown in the dispensing state.
Figure 5:
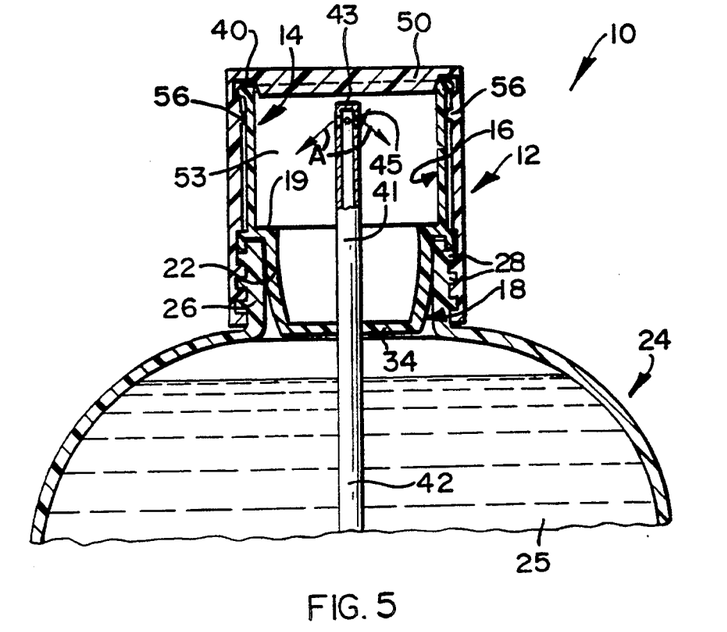
FIG. 5 is a sectional side view of yet another embodiment of a dispensing device in accordance with the invention, the view corresponding to the views shown in FIGS. 1 and 3 and with the closure cap shown in the closed state.
Figure 6:
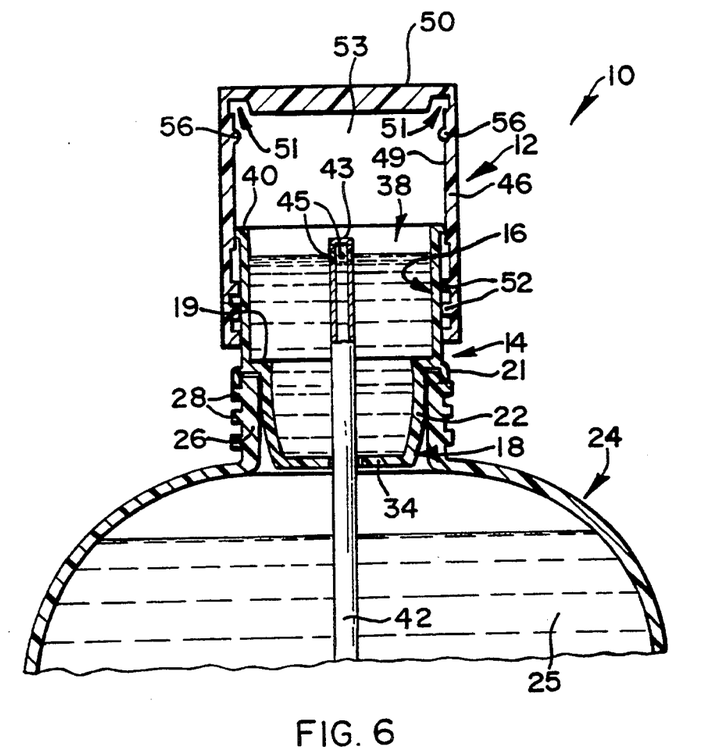
FIG. 6 is a sectional side view corresponding to FIG. 5 but with the closure cap shown in the dispensing state.

The receptacle 14 comprises two hollow cylindrical portions namely an upper hollow cylindrical portion 16 of greater cross-sectional dimensions, and a lower hollow generally cylindrical portion 18 of smaller cross-sectional dimensions, together comprising the receptacle 14. The lower portion 18 is designed to function also as a stopper, to close the outlet of the container as explained more fully below. The stopper part 18 of the receptacle 14 has a generally cylindrical side wall 22.1 and a transverse base wall 34, the side wall 22.1 tapering in curved fashion towards the base wall 34 to facilitate insertion of the stopper part 18 into the bottle neck 26 and at the same time to provide a snug and secure fit thereof in the neck 26. The side wall 22.1 defining the stopper part 18 bulges outwardly slightly as can be seen in the drawings. The upper portion 16 of the receptacle 14 is generally cup-shaped and has an upstanding cylindrical side wall 22.2 terminating in an open upper end 38. The side wall 22.2 has an outer face 22.3 directed towards an inner face 49 of the closure cap 12, as referred to more fully below. On the outer face 22.3 of the cup part 16, an outwardly extending sealing lip 40 is provided, the sealing lip 40 being in the form of a peripheral lip extending circumferentially around the open upper end 38. The lip 40 is located in sealing relationship against the inner face 49 of the closure cap 12, and the lip will slide sealingly along the inner face 49 when the closure cap is displaced between the closed position as depicted in FIGS. 1, 3 and 5 and the dispensing position as depicted in FIGS. 2, 4 and 6.

An annular shoulder formation 19 connects the narrower stopper part 18 and the wider cup part 16 of the receptacle 14. When the stopper part 18 is inserted into the neck 26 of a container 24 in bottle form, the shoulder formation will be located on the rim 27 of the neck 26, as clearly shown in the drawings.

The cup part 16 accordingly extends above the rim 27 of the neck 26, and is situated in an exposed position to co-operate with the closure cap 12 for creating a suction effect, as described more fully below.

An annular flange or lip 21 is provided on the shoulder formation 19, which engages with the neck 26 to improve the sealing between the neck 26 and the stopper part 18.

If desired, capillary air inlet means in the form of grooves 39 may be provided, as shown in the embodiment of FIGS. 1 and 2, the grooves 39 being provided on the outer surface of the side wall 22.1 of the stopper part 18 to place the inside of the bottle 24 in air flow communication with the atmosphere. The objective is to bring about pressure equalizing between the inside of the bottle 24 and the atmosphere. However, unless the grooves 39 are of small enough dimensions, and particularly if the liquid 25 in the bottle 24 has a low viscosity, the grooves 39 may cause leakage if the bottle 24 is not stood in an upright state.

The dispenser 10 is shown in FIGS. 1 to 6 mounted on a container in the form of a bottle 24 containing a liquid 25. The bottle has a neck 26 and a base 29 shown in FIG. 7. The neck 26 of the bottle 24 has a rim 27 and is provided with an external screw thread 28. The stopper part 18 of the receptacle 14 fits snugly into the neck 26 of the bottle 24, the outwardly bulging side wall 22 acting as a gripping formation for impeding withdrawal of the dispensing device 10 from the bottle as is described in further detail below.

A conduit in the form of a tube 42 passes through the base wall 34 of the receptacle 14 and extends upwardly into the cup part 16 of the receptacle 14 and downwardly into the bottle 24. The tube 42 has an upper end 43 and a lower open end 47. The upper end 43 is sealed and a number of outlet openings 45 are located just below the sealed upper end 43, the outlet openings 45 being directed sideways to expel liquid from the tube 42 in a direction away from the open mouth 38 of the cup part 18, e.g. in the direction of the arrows A shown in FIGS. 1, 3 and 5.

The cap-type closure lid 12 has a cylindrical side wall 46 with an inner surface 49, and is closed at one end with a transverse top wall 50. As shown in FIGS. 1 to 6 of the drawings, the lid 12 is provided on the underside of its top wall 50, and at its peripheral edge where the wall 50 meets the depending cylindrical side wall 46, with an annular groove 51. This groove 51 is intended to receive the peripheral sealing lip 40 of the cup part 16, when the lid 12 is in the closed position, as illustrated in FIGS. 1, 3 and 5. By retaining the sealing lip 40 in position, undesired deformation of the lip 40 is prevented or at least diminished, and the lip 40 maintains its rounded shape to ensure proper sealing against the inside face 49 of the side wall 46.

Figure 7:
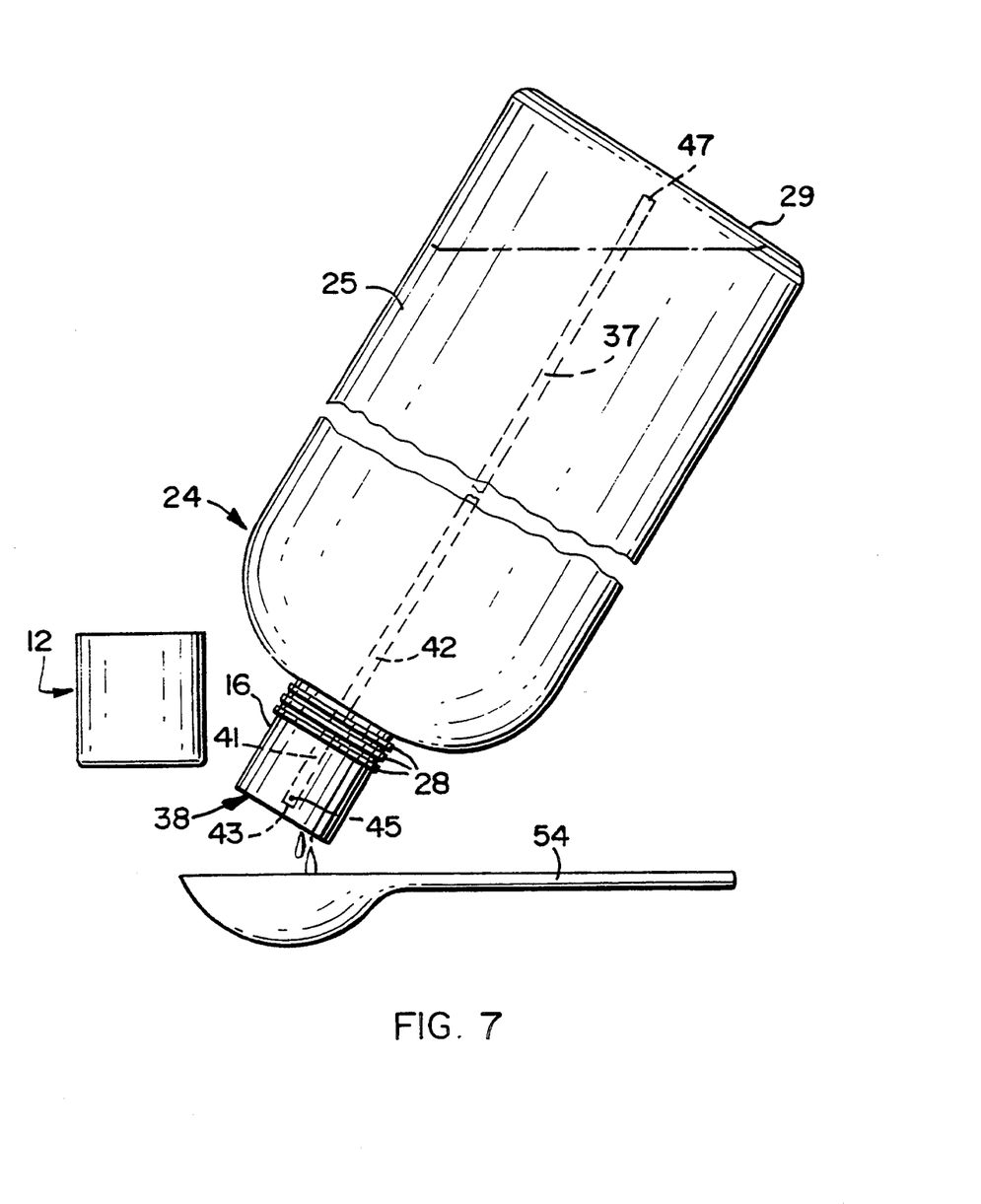
FIG. 7 is a side view of a bottle provided with the dispensing device of the invention, with the closure cap in the open state to illustrate the bottle in use.

The lid 12 associated with the dispensing device is displaceable between a closed position as illustrated in FIGS. 1, 3 and 5, when it engages with the neck 26 of the bottle 24; a dispensing position as illustrated in FIGS. 2, 4 and 6, when the lid 12 is displaced away from the neck 26 and liquid 25 has been sucked into the cup part 16 of the receptacle 14; and an open condition as illustrated in FIG. 7, when the lid 12 is entirely removed from the bottle 24 to expose the open upper end or mouth 38 of the cup part 16.

During said displacement of the lid 12, the sealing lip 40 slides sealingly along the inner face 49 of the side wall 46 of the lid 12.

The lower part of the inner surface 49 of the side walls 46 is provided with a thread 52 complementary to the thread 28 on the neck of the bottle 24. It will be observed that the lid 12 fits over and around the receptacle 14, with the lip 40 providing a seal between the inner surface 49 of the side wall 46 and the receptacle 14. The base wall 34 and side walls 22.1, 22.2 of the receptacle 14, and the side wall 46 and top wall 50 of the lid 12 together define a suction chamber 53, the functioning of which is described below.

Alternative embodiments of the dispensing device are shown in FIGS. 3 and 4, and 5 and 6 respectively. In both these embodiments, air release means is provided to permit air which is compressed in the chamber 53 when the lid 12 is displaced from the dispensing position to the closed position, to be expelled. The air release means shown in FIGS. 3 and 4 comprise a pair of small depressions or notches 55 formed in the inner face 49 of the side walls 46 of the lid 12, near the top end of the lid 12. When the lid 12 is displaced to its closed position, the sealing lip 40 will pass over the notches 55, and air passages will be created to allow air to escape from the chamber 53.

In the embodiment illustrated in FIGS. 5 and 6, protuberances 56 are provided instead of notches 55. Again displacement of the sealing lip 40 over the protuberances 56 when the lid 12 is closed, will create air passages since the lip 40 will be slightly deformed.

Since the air release means are provided near the top of the lid 12, in a position where no liquid will be present, no leakage will occur.

The dispenser 10 is made of a synthetic plastics material such as polyethylene. The bottle 24 may likewise be made of a synthetic plastics material. It is possible for the bottle 24 and the receptacle 14 to be integrally molded. Preferably, however, the bottle 24 may be a glass bottle.

In use, the dispenser 10 is fitted to the bottle 24 by inserting the stopper portion 18 into the neck 26 of the bottle 24. The bulging portion of the side wall 22 serves to hinder withdrawal of the stopper portion 18 from the neck 26 of the bottle 24, the annular lip 21 providing an additional sealing effect between the stopper portion 18 and the neck 26 of the bottle. The lid 12 then fits sealingly over the receptacle 14 and is screw-threadedly held in position by the complementary threads 28 and 52 on the neck 26 and lid 12 respectively. The lip 40 provides a seal between the reservoir 14 and the inner surface 49 of the lid 12 as described above. The tube 42 projects downwardly into the liquid 25 in the bottle 24, with the lower end 47 of the tube 42 being located slightly above the base of the bottle 24 as can be seen in FIG. 7.

In use, liquid 25 is drawn from the bottle 24 through the conduit 42 into the receptacle 14 by section, in the following manner:

With the bottle 24 in a generally upright condition, the lid 12 is unscrewed and displaced over the receptacle 14. A negative pressure is created in the chamber 53 inside the receptacle 14 because of the seal between the lip 40 and the inner surface 49 of the lid 12, and liquid 25 is sucked up through the tube 42 via the openings 45 into the recepticle 14, while air leaks into the bottle via the grooves 39 in the stopper portion 18 as is shown in FIGS. 1 and 2. The lid 12 is then removed and atmospheric pressure is restored to the chamber 53. Excess liquid 25 which has been sucked into the receptacle 14 then flows back through the conduit 42 into the bottle 24 until the level of liquid in the receptacle 14 reaches the level of the apertures 45 located just below the upper end 43 of the conduit 42.

When the bottle 24 is tilted in order to dispense the liquid from the recepticle 14, for example into a spoon 54, the lower end of the conduit 42 protrudes from the liquid 25 remaining in the bottle 24 as can be seen in FIG. 7 and no further liquid can flow through the conduit 42. In this way a measured volume of liquid may repeatedly be dispensed from the dispensing device 10. In a typical embodiment of the invention, the volume of liquid remaining in the receptacle 14 is 5 ml.

The Applicant believes that the dispenser of the invention provides a simple and accurate method for dispensing a measured volume of a liquid such as a medicine from the bottle, so that over-or underdosing can be avoided. The dispenser has, in addition, the safety feature that withdrawal of the device from the mouth of a medicine bottle is difficult because of the gripping formation provided on the stopper portion of the device.

I claim:

1. A dispensing device for dispensing a measured volume of liquid from a body of liquid contained in a container in bottle form having a bottom and a neck provided with a rim defining an outlet, the dispensing device including a receptacle for receiving an unmeasured excess volume of liquid from the body of liquid, the receptacle having a stopper part for insertion into the neck of the container in sealing relationship, and a cup part to extend outside the neck beyond the rim of the neck;

a conduit to extend between the container and the receptacle to permit liquid to flow from the body of liquid into the receptacle;

a cap-type lid removably associated with the receptacle and the neck to fit over and around the cup part of the receptacle and the neck and engageable with the outside of the neck; and volume adjustment means to adjust a said unmeasured excess volume of liquid in the receptacle to a measured volume; and in which the cup part of the receptacle has an upstanding side wall presenting an outer face and an open upper end and is provided on the outer face with an outwardly extending circumferential sealing lip; and the cap-type lid has a transverse top wall and a depending side wall presenting an inner face which is located in sealing relationship with the sealing lip of the cup part when the lid is in position on the receptacle; and the lid is displaceable relative to the receptacle among a closed position in which the lid is engaged with the outside of the neck of the container, a dispensing position in which the lid is located over the cup part of the receptacle but spaced from the neck of the container, and an open position in which the lid is removed from the receptacle to expose the open upper end of the cup part, the sealing lip of the cup part and the said inner face of the lid being located in sliding sealing relationship during displacement between the closed position and the dispensing position; and in which the receptacle and the lid define between them a closed chamber when the lid is fitted over the receptacle, and displacement of the lid from the closed position to the dispensing position causes a pressure reduction within the chamber to cause a said unmeasured excess volume of liquid to flow from the body of liquid through the conduit into the receptacle, the said excess volume being adjusted to a said measured volume of liquid by the volume adjustment means.

2. A dispensing device as claimed in claim 1, in which the receptacle is of stepped configuration having a generally upwardly extending side wall defining a narrower lower portion with a transverse base wall constituting the stopper part, and a wider upper portion with an open upper end constituting the cup part, the narrower lower portion being connected to the wider upper portion by an annular shoulder in use to be located on the rim of the neck of the container.

3. A dispensing device as claimed in claim 2, in which the conduit comprises a tube passing through the transverse base wall of the stopper part of the receptacle, the tube having an upper portion and a lower portion, the tube upper portion projecting operatively upwardly from the said base wall into the cup part of the receptacle and having a closed upper end and at least one sideways directed outlet opening, and the tube lower portion extending operatively downwardly from the said base wall to the bottom of the container and terminating in an open lower end in use located in the proximity of the bottom of the container, to place the body of liquid in the container in liquid flow communication with the receptacle.

4. A dispensing device as claimed in claim 3, in which the height of the upper portion of the tube and the level of the at least one outlet opening above the said base wall of the receptacle constitute the said volume adjustment means, said height of the upper portion of the tube and said at least one level of the outlet opening being selected to determine a required measured volume, and in which the at least one outlet opening permits excess liquid in the receptacle to return to the body of liquid via the tube when the reduced pressure in the chamber is equalized by displacement of the lid to the open position.

5. A dispensing device as claimed in claim 1, in which the circumferential sealing lip on the cup part is in the form of a peripheral lip formation extending around the open upper end of the cup part, and in which the transverse top wall of the lid has an inner face with an annular groove provided in the said top wall inner face to receive the peripheral sealing lip on the cup part of the receptacle when the lid is in the closed position.

6. A dispensing device as claimed in claim 1, in which air release means is provided to permit compressed air to escape from the closed chamber when the lid is displaced to its closed position, the air release means comprising a depression in the inner face of the side wall of the lid located in the proximity of the transverse top wall of the lid, to create an air passage when the sealing lip of the cup part is displaced over the said depression when the lid is displaced to the closed position.

7. A dispensing device as claimed in claim 1, in which air release means is provided to permit compressed air to escape from the closed chamber when the lid is displaced to its closed position, the air release means comprising a protuberance on the inner face of the side wall of the lid located in the proximity of the transverse top wall of the lid, to create an air passage when the sealing lip of the cup part is displaced over and is deformed by the said protuberance when the lid is displaced to the closed position.

* * * * *